United States Patent
Klatt

(10) Patent No.: US 10,932,189 B2
(45) Date of Patent: Feb. 23, 2021

(54) METHOD FOR AN ENHANCED POWER CONSUMPTION MANAGEMENT OF A USER EQUIPMENT USING A MOBILE COMMUNICATION NETWORK AND A RADIO ACCESS TECHNOLOGY, USER EQUIPMENT, SYSTEM, PROGRAM COMPRISING A COMPUTER READABLE PROGRAM CODE, AND COMPUTER PROGRAM PRODUCT

(71) Applicant: Deutsche Telekom AG, Bonn (DE)

(72) Inventor: Axel Klatt, Cologne (DE)

(73) Assignee: DEUTSCHE TELEKOM AG, Bonn (DE)

( * ) Notice: Subject to any disclaimer, the term of this patent is extended or adjusted under 35 U.S.C. 154(b) by 18 days.

(21) Appl. No.: 16/063,745

(22) PCT Filed: Feb. 3, 2017

(86) PCT No.: PCT/EP2017/052390
§ 371 (c)(1),
(2) Date: Jun. 19, 2018

(87) PCT Pub. No.: WO2017/140517
PCT Pub. Date: Aug. 24, 2017

(65) Prior Publication Data
US 2019/0342829 A1    Nov. 7, 2019

(30) Foreign Application Priority Data
Feb. 18, 2016 (EP) .................. 16156408

(51) Int. Cl.
*H04W 52/02* (2009.01)
*H04L 29/08* (2006.01)
*H04W 8/20* (2009.01)

(52) U.S. Cl.
CPC ......... *H04W 52/0216* (2013.01); *H04L 67/12* (2013.01); *H04W 8/20* (2013.01)

(58) Field of Classification Search
CPC ...... H04W 52/0216; H04W 8/20; H04L 67/12
See application file for complete search history.

(56) References Cited

U.S. PATENT DOCUMENTS

2010/0240356 A1   9/2010  Lee et al.
2013/0109377 A1*  5/2013  Al-Khudairi ......... H04W 48/16
                                                      455/432.1
(Continued)

FOREIGN PATENT DOCUMENTS

| EP | 1260109 A1 | 11/2002 |
| EP | 1885141 A1 | 2/2008 |
| WO | WO 0158190 A1 | 8/2001 |

OTHER PUBLICATIONS

3GPP TS 22.011 V14.1.0 (Dec. 2015) (Year: 2015).*

*Primary Examiner* — Gary Mui
*Assistant Examiner* — Stephen N Steiner
(74) *Attorney, Agent, or Firm* — Leydig, Voit & Mayer, Ltd.

(57) ABSTRACT

A method for enhanced power consumption management of a user equipment using a mobile communication network and a radio access technology. The user equipment is provided with priority information regarding at least one of the mobile communication network and the radio access technology. The method includes performing, by the user equipment in case that the priority information indicates a sufficiently low priority of at least one of the mobile communication network used by the user equipment and the radio access technology used by the user equipment, a network selection procedure to find a higher priority mobile communication network after a time interval has elapsed. The user equipment includes an entity realizing the func- (Continued)

tionality of a subscriber identity module that includes time interval related information such that the time interval depends on the time interval related information.

26 Claims, 2 Drawing Sheets

(56) References Cited

U.S. PATENT DOCUMENTS

2013/0273914 A1    10/2013  Speks
2015/0023184 A1*   1/2015   Cili ..................... H04W 24/08
                                                        370/252
2015/0223285 A1*   8/2015   Ljung ............... H04W 52/0209
                                                        370/311

* cited by examiner

METHOD FOR AN ENHANCED POWER CONSUMPTION MANAGEMENT OF A USER EQUIPMENT USING A MOBILE COMMUNICATION NETWORK AND A RADIO ACCESS TECHNOLOGY, USER EQUIPMENT, SYSTEM, PROGRAM COMPRISING A COMPUTER READABLE PROGRAM CODE, AND COMPUTER PROGRAM PRODUCT

CROSS REFERENCE TO RELATED APPLICATIONS

This application is a U.S. National Stage Application under 35 U.S.C. § 371 of International Application No. PCT/EP2017/052390 filed on Feb. 3, 2017, and claims benefit to European Patent Application No. EP 16156408.3 filed on Feb. 18, 2016. The International Application was published in English on Aug. 24, 2017 as WO 2017/140517 A1 under PCT Article 21(2).

FIELD

The present invention relates to a method for an enhanced power consumption management of a user equipment using a mobile communication network and a radio access technology, the user equipment being provided with a priority information regarding the mobile communication network and/or the radio access technology.

Furthermore, the present invention relates to a user equipment for an enhanced power consumption management of the user equipment using a mobile communication network and a radio access technology.

Additionally, the present invention relates to a system for an enhanced power consumption management of a user equipment using a mobile communication network and a radio access technology.

Furthermore, the present invention relates to a program and to a computer program product for an enhanced power consumption management of a user equipment using a mobile communication network and a radio access technology.

BACKGROUND

User equipments, such as mobile phones, smart phones, tablet devices or the like, using mobile communication networks are typically powered by means of rechargeable batteries or accumulators. This means that such devices should behave in a manner that the available electrical power is preserved as much as possible.

This is especially true for groups of devices that particularly depend on preserving the available electrical power, such as machine type communication devices or the like, e.g. user equipments specifically designed for being used in machine-to-machine communication or for Internet-of-Things communication (such as, e.g., the narrow-band Internet-of-Things (NB-IoT) devices or devices of the LTE Cat-M or EC-GSM category). Such devices often have the requirement to be able to be operational during extended periods of time—such as many months to many years—without their power supply recharged or exchanged.

SUMMARY

In an embodiment, the present invention provides a method for enhanced power consumption management of a user equipment using a mobile communication network and a radio access technology. The user equipment is provided with priority information regarding at least one of the mobile communication network or the radio access technology. The method includes performing, by the user equipment in case that the priority information indicates a sufficiently low priority of at least one of the mobile communication network used by the user equipment or the radio access technology used by the user equipment, a network selection procedure to find a higher priority mobile communication network after a time interval has elapsed. The user equipment comprises an entity realizing the functionality of a subscriber identity module, wherein the entity realizing the functionality of a subscriber identity module comprises time interval related information such that the time interval depends on the time interval related information stored in the entity realizing the functionality of the subscriber identity module, wherein the information content of the time interval related information corresponds to a predetermined number of positive integer values. The dependency of the time interval on the information content of the time interval related information corresponds to one out of the following alternatives: (i) the time interval corresponds to the information content of the time interval related information, multiplied by a product of a constant scaling value of 6 minutes and a time interval adaption factor, wherein the time interval adaption factor or the reciprocal of the time interval adaption factor corresponds to a value of 3 or larger than 3, (ii) the time interval corresponds to the information content of the time interval related information, multiplied by a constant scaling value being different from 6 minutes, wherein the constant scaling value corresponds to at least 10 minutes, or (iii) the time interval corresponds to the information content of the time interval related information, multiplied by an increasing scaling value such that the increasing scaling value increases as a function of the information content of the time interval related information.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
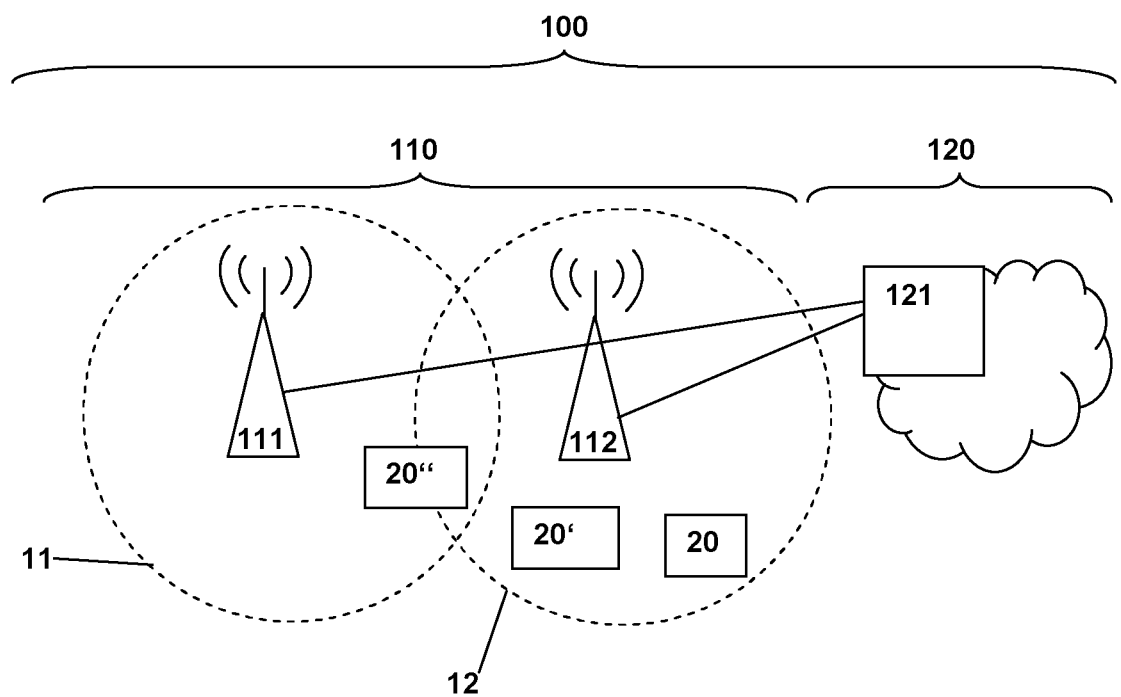
FIG. 1 schematically illustrates a mobile communication network comprising a plurality of radio cells being served by a plurality of base station entities, and a plurality of user equipments being served by the mobile communication network.

The present invention provides a method for an enhanced power consumption management of a user equipment that normally performs a network selection procedure to find a higher priority mobile communication network in case that both a time interval has elapsed, and the priority regarding the mobile communication network and/or the radio access technology used by the user equipment indicates a sufficiently low priority, such that the electrical power available to the user equipment is preserved as long as possible and, hence, the user equipment is operational for a longer time.

According to an embodiment of the invention, a method is provided for an enhanced power consumption management of a user equipment using a mobile communication network and a radio access technology, the user equipment being provided with a priority information regarding the mobile communication network and/or the radio access technology, wherein—in case that the priority information, regarding the mobile communication network used by the user equipment and/or the radio access technology used by the user equipment, indicates a sufficiently low priority of the mobile communication network used by the user equipment and/or of the radio access technology used by the user equipment—a network selection procedure to find a higher priority mobile communication network is performed by the user equipment after a time interval has elapsed, wherein the user equipment comprises an entity realizing the functionality of a subscriber identity module, wherein the entity realizing the functionality of a subscriber identity module comprises a time interval related information such that the time interval, to be applied by the user equipment to perform the network selection procedure for a higher prioritized mobile communication network, depends on the time interval related information stored in the entity realizing the functionality of a subscriber identity module, wherein the information content of the time interval related information corresponds to a predetermined number of positive integer values, wherein the dependency of the time interval, to be applied by the user equipment, on the information content of the time interval related information corresponds to one out of the following alternatives:

according to a first alternative, the time interval corresponds to the information content of the time interval related information, multiplied by the product of a constant scaling value of 6 minutes and a time interval adaption factor, wherein the time interval adaption factor or the reciprocal of the time interval adaption factor corresponds to a value of 3 or larger than 3, especially a value of or in the vicinity of 5, or a value of or in the vicinity of 10, or a value of or in the vicinity of 20, or a value of or in the vicinity of 50, or a value of or in the vicinity of 100, or a value of or in the vicinity of 500, or a value of or in the vicinity of 1000, according to a second alternative, the time interval corresponds to the information content of the time interval related information, multiplied by a constant scaling value being different from 6 minutes, wherein the constant scaling value corresponds to at least 10 minutes, preferably at least 20 minutes, more preferably at least 30 minutes, still more preferably at least 60 minutes, still more preferably at least 100 minutes, still more preferably 120 minutes or at least 120 minutes, still more preferably at least 180 minutes, still more preferably at least 240 minutes, still more preferably at least 300 minutes, still more preferably at least 360 minutes, still more preferably at least 420 minutes, still more preferably at least 480 minutes, still more preferably at least 540 minutes, still more preferably at least 600 minutes, still more preferably at least 1000 minutes, according to a third alternative, the time interval corresponds to the information content of the time interval related information, multiplied by an increasing scaling value such that the increasing scaling value increases as a function of the information content of the time interval related information, according to a fourth alternative, the time interval corresponds to the result of a mapping of the information content of the time interval related information, wherein the mapping information defining the mapping is stored in a memory portion within the user equipment.

According to the present invention, it is advantageously possible for the user equipment to perform the network selection procedure less often and hence save electrical power in case the mobile communication network and/or the radio access technology used by the user equipment corresponds to a mobile communication network or to a radio access technology or to a combination of mobile communication network and radio access technology having a sufficiently low priority, based on a priority information that the user equipment is provided (typically by the network operator of the home mobile communication network (or home public land mobile network) of the user equipment) with regarding the mobile communication network and/or the radio access technology.

The network selection procedure is normally triggered if both a sufficiently low network (and/or radio access technology) priority is established by the user equipment, and a time interval has elapsed. The time interval is determined by a time interval related information stored in an entity realizing the functionality of a subscriber identity module of the user equipment. The information content of the time interval related information corresponds to a predetermined number of positive integer values. Normally, especially in case that the entity realizing the functionality of a subscriber identity module corresponds to a subscriber identity card (or SIM card), the time interval related information corresponds to an integer that can take the values of 1, 2, 3, . . . , 80, i.e. the information content of the time interval related information corresponds to 1, 2, 3, . . . 80. Additionally, the time interval related information can typically also take an information content indicating that no time interval exists, or otherwise stated, that the time interval is of infinite duration (hence, the time interval related information taking this value corresponds to the network selection procedure being never invoked by a respective user equipment). However, this last mentioned possibility is of less relevance for the present invention.

According to different alternatives according to the present invention, the dependency of the time interval (to be applied for triggering the network selection procedure) on the information content of the time interval related information is as follows.

According to a first alternative, the time interval corresponds to the information content of the time interval related information, multiplied by the product of a constant scaling value of 6 minutes (typically stored in a memory portion of the user equipment) and a time interval adaption factor (typically likewise stored in a memory portion of the user equipment), wherein the time interval adaption factor or the reciprocal of the time interval adaption factor corresponds to a value of 3 or larger than 3. This means that the presently implemented manner to adjust the time interval can remain untouched but that nevertheless an extended period can be chosen as the time interval, this being especially advantageous in case of certain categories of user equipments that are typically related to machine-to-machine communication or machine type communication. Additionally, by means of the time interval adaption factor can also have values smaller than one, it is also possible to decrease the duration of the time interval. According to the present invention, in principle all values of 3 or higher for the time interval adaption factor or its reciprocal are possible, especially a value of or in the vicinity of 5, or a value of or in the vicinity of 10, or a value of or in the vicinity of 20, or a value of or in the vicinity of 50, or a value of or in the vicinity of 100, or a value of or in the vicinity of 500, or a value of or in the vicinity of 1000.

According to a second alternative, the time interval corresponds to the information content of the time interval related information, multiplied by a constant scaling value being different from 6 minutes. Preferably, the constant scaling value corresponds to at least 10 minutes, preferably at least 20 minutes, more preferably at least 30 minutes, still more preferably at least 60 minutes, still more preferably at least 100 minutes, still more preferably 120 minutes or at least 120 minutes, still more preferably at least 180 minutes, still more preferably at least 240 minutes, still more preferably at least 300 minutes, still more preferably at least 360 minutes, still more preferably at least 420 minutes, still more preferably at least 480 minutes, still more preferably at least 540 minutes, still more preferably at least 600 minutes, still more preferably at least 1000 minutes.

According to another example according to the second alternative, the scaling value corresponds to 120 minutes preferably for (or approximately for) the first half of (the values of) the information content of the time interval related information and the scaling value corresponds to 240 minutes preferably for (or approximately for) the second half of (the values of) the information content of the time interval related information (e.g., (approximately) for values of the information content of the time interval related information from decimal values of "2" to "40", the scaling value corresponds to 120 minutes, and (approximately) for decimal values of the information content of the time interval related information from "41" to "80", the scaling value corresponds to 240 minutes).

According to a third alternative, the time interval corresponds to the information content of the time interval related information, multiplied by an increasing scaling value such that the increasing scaling value increases as a function of the information content of the time interval related information, i.e. according to an example, the following value pairs of (1) the time interval related information indicating an information content, and (2) the time interval could apply:

| 1 | 1 minute, |
| 2 | 2 minutes, |
| 3 | 3 minutes, |
| 4 | 5 minutes, |
| 5 | 8 minutes, |
| 6 | 13 minutes, |
| 7 | 21 minutes, |
| 8 | 34 minutes, |
| 9 | 55 minutes, |
| 10 | 89 minutes, |
| 11 | 144 minutes, |
| 12 | 223 minutes, |
| 13 | 367 minutes, |
| 14 | 590 minutes. |

According to another example according to the third alternative, the scaling value is increased such that—preferably for (or approximately for) the second half of (the values of) the information content of the time interval related information—it is twice the scaling value preferably of (or approximately of) the first half of (the values of) the information content of the time interval related information and that the scaling value is 120 minutes preferably for (or approximately for) the first half of (the values of) the information content of the time interval related information.

According to a fourth alternative, the time interval corresponds to the result of a mapping of the information content of the time interval related information, wherein the mapping information defining the mapping is stored in a memory portion within the user equipment.

According to the presently standardized approach, there are a number of different integer values that the time interval related information are able to take (besides the value indicating that no time interval exists, i.e. that the time interval is of infinite duration), and each of these values correspond to a duration of the time interval of n*6 minutes, n being the value (or the information content) of the time interval related information, which results in a minimum duration of the time interval of 6 minutes and a maximum duration (with, e.g., 80 different integer values of the time interval related information) of 80*6 minutes=480 minutes. This spread of the possible duration of the time interval between 6 minutes and 480 minutes is inappropriate for a number use cases, especially regarding user equipments related to machine type communication and/or machine-to-machine communication. All the alternatives according to the present invention have in common that advantageously a higher degree of flexibility is possible to achieve with regard to the resulting time interval a user equipment is applying in respect of a possible network selection procedure.

According to a preferred embodiment of the present invention, the interval adaption factor and/or the constant scaling value or the increasing scaling value or the mapping information is stored in a memory portion within the user equipment, wherein especially different interval adaption factors and/or different constant scaling values and/or different increasing scaling values and/or different mapping information apply for different device categories of user equipments, wherein especially user equipments optimised for machine-to-machine communication or Internet-of-Things communication (such as the narrow-band Internet-of-Things (NB-IoT) or LTE Cat-M or EC-GSM category) apply interval adaption factors and/or constant scaling values and/or increasing scaling values and/or mapping information such that the resulting time interval far exceeds time intervals applied with other categories of user equipments.

Thereby, it is advantageously possible that an enhanced flexibility and an approach regarding the duration of the time interval is possible to implement that is more adapted to specific device categories of user equipments, especially device categories of user equipments requiring an increased time interval.

According to a further preferred embodiment of the present invention, the increasing scaling value increases, at least approximately, exponentially.

Thereby, it is advantageously possible to be able to implement an increased spread regarding the possible duration of the time interval.

It is furthermore preferred according to the present invention that the user equipment comprises or is associated to or is assigned to a power source, wherein a power status information indicates different levels of power available to the user equipment (or the power status information provides an indication regarding the electrical power available to the user equipment), wherein in case that the power status information indicates a sufficiently low power level of the power source, the effective time interval, to be applied by the user equipment, is increased by means of increasing one of the following: the time interval adaption factor, the time interval adaption factor and the constant scaling value, the constant scaling value, the increasing scaling value, and the mapping information, or the network selection procedure is omitted by the user equipment even after the time interval has elapsed.

It is thereby advantageously possible to configure the user equipment such as to use the available electrical power—especially in situations of comparatively low residual available electrical power—such that a longer duration of productive operation is possible for the user equipment, rather than to spend the available electrical power for the purpose of performing additional network selection procedures in order to optimize the network selection. Advantageously, the situation that the power status information indicates a sufficiently low power level of the power source typically means that a predetermined threshold regarding the available residual power within the power source not reached (i.e. the available power within the power source has fallen below the predetermined threshold) such that in turn the power status information indicates a sufficiently low power level. According to a further preferred embodiment of the present invention, not only one but two (or even more) such predetermined thresholds exist, one such threshold (hereinafter called first power threshold) corresponding to more available residual power within the power source, say e.g., 40% of the total capacity, and one such threshold (hereinafter called second power threshold) corresponding to even less available residual power within the power source of, say e.g., 20% of the total capacity: In case that the available residual power within the power source falls below the first power threshold, this is indicated by means of the power status information, resulting in an increase of the effective time interval (to a first modified time interval to be applied by the user equipment, wherein the first modified time interval exceeds the effective time interval previously applied), wherein in case that the available residual power within the power source falls below the second power threshold, this is likewise indicated by means of the power status information, resulting in a still further increase of the effective time interval (to a second modified time interval to be applied by the user equipment, wherein the second modified time interval exceeds the first modified time interval).

According to still a further preferred embodiment of the present invention, based on the user equipment being detected to be located at a special geographic area and/or based on the user equipment using a mobile communication network being part of a list of special mobile communication networks, the effective time interval, to be applied by the user equipment, is increased by means of increasing one of the following: the time interval adaption factor, the time interval adaption factor and the constant scaling value, the constant scaling value, the increasing scaling value, and the mapping information, or the network selection procedure is omitted by the user equipment even after the time interval has elapsed.

Thereby, it is advantageously possible according to the present invention that the effective time interval applied by the user equipment can also be adapted dependent on the geographic area the user equipment is located and/or dependent on the user equipment using a special mobile communication network or a plurality of special mobile communication networks. According to still further embodiments of the present invention, at least a first geographic area and a second geographic area are defined and/or at least a first list of special mobile communication networks and a second list of other special mobile communication networks are defined. In case that the user equipment is detected to be located in the first geographic area and/or in case that the user equipment uses a mobile communication network being part of the first list of special mobile communication networks a modification of the effective time interval (to a third modified time interval to be applied by the user equipment, wherein the third modified time interval typically (but not necessarily) differs from the effective time interval previously applied, i.e. prior to the user equipment entering the first geographic area), wherein in case that the user equipment is detected to be located in the second geographic area and/or in case that the user equipment uses a mobile communication network being part of the second list of special mobile communication networks, a modification of the effective time interval (to a fourth modified time interval to be applied by the user equipment, wherein the fourth modified time interval typically (but not necessarily) differs from the effective time interval previously applied, i.e. prior to the user equipment entering the second geographic area).

According to another preferred embodiment of the present invention, the time interval adaption factor and/or the constant scaling value and/or information defining the increasing scaling value and/or the mapping defining information and/or information indicating the special geographic area and/or the list of special mobile communication networks is transmitted to the user equipment, especially to be stored in a memory portion within the user equipment, or stored in the entity realizing the functionality of a subscriber identity module, and especially using the mobile communication network.

Thereby, it is advantageously possible according to the present invention that an adaptive behaviour of the user equipment is comparatively easy to be implemented. Furthermore, it is advantageously possible according to the present invention that such information (i.e. the time interval adaption factor and/or the constant scaling value and/or information defining the increasing scaling value and/or the mapping defining information and/or information indicating the special geographic area and/or the list of special mobile communication networks)—at least in part—are transmitted to the user equipment via over the air mechanisms.

The present invention also relates to a user equipment for an enhanced power consumption management of the user equipment using a mobile communication network and a radio access technology, the user equipment being provided with a priority information regarding the mobile communication network and/or the radio access technology, wherein the user equipment is configured such that—in case that the priority information, regarding the mobile communication network used by the user equipment and/or the radio access technology used by the user equipment, indicates a sufficiently low priority of the mobile communication network used by the user equipment and/or of the radio access technology used by the user equipment—a network selection procedure to find a higher priority mobile communication network is performed by the user equipment after a time interval has elapsed, wherein the user equipment comprises an entity realizing the functionality of a subscriber identity module, wherein the entity realizing the functionality of a subscriber identity module comprises a time interval related information such that the time interval, to be applied by the user equipment to perform the network selection procedure for a higher prioritized mobile communication network, depends on the time interval related information stored in the entity realizing the functionality of a subscriber identity module, wherein the information content of the time interval related information corresponds to a predetermined number of positive integer values, wherein the user equipment is configured such that the dependency of the time interval, to be applied by the user equipment, on the information content of the time interval related information corresponds to one out of the following alternatives:

according to a first alternative, the time interval corresponds to the information content of the time interval related information, multiplied by the product of a constant scaling value of 6 minutes and a time interval adaption factor, wherein the time interval adaption factor or the reciprocal of the time interval adaption factor corresponds to a value of 3 or larger than 3, especially a value of or in the vicinity of 5, or a value of or in the vicinity of 10, or a value of or in the vicinity of 20, or a value of or in the vicinity of 50, or a value of or in the vicinity of 100, or a value of or in the vicinity of 500, or a value of or in the vicinity of 1000, according to a second alternative, the time interval corresponds to the information content of the time interval related information, multiplied by a constant scaling value being different from 6 minutes, wherein the constant scaling value corresponds to at least 10 minutes, preferably at least 20 minutes, more preferably at least 30 minutes, still more preferably at least 60 minutes, still more preferably at least 100 minutes, still more preferably 120 minutes or at least 120 minutes, still more preferably at least 180 minutes, still more preferably at least 240 minutes, still more preferably at least 300 minutes, still more preferably at least 360 minutes, still more preferably at least 420 minutes, still more preferably at least 480 minutes, still more preferably at least 540 minutes, still more preferably at least 600 minutes, still more preferably at least 1000 minutes, according to a third alternative, the time interval corresponds to the information content of the time interval related information, multiplied by an increasing scaling value such that the increasing scaling value increases as a function of the information content of the time interval related information, according to a fourth alternative, the time interval corresponds to the result of a mapping of the information content of the time interval related information, wherein the mapping information defining the mapping is stored in a memory portion within the user equipment.

Thereby it is advantageously possible, that—also with respect to the user equipment—it is possible that user equipment performs the network selection procedure less often and hence save electrical power in case that the mobile communication network and/or the radio access technology used by the user equipment corresponds to a mobile communication network or to a radio access technology or to a combination of mobile communication network and radio access technology having a sufficiently low priority.

Additionally, the present invention relates to a system for an enhanced power consumption management of a user equipment using a mobile communication network and a radio access technology, the system comprising the mobile communication network and the user equipment, user equipment being provided with a priority information regarding the mobile communication network and/or the radio access technology, wherein the user equipment is configured such that—in case that the priority information, regarding the mobile communication network used by the user equipment and/or the radio access technology used by the user equipment, indicates a sufficiently low priority of the mobile communication network used by the user equipment and/or of the radio access technology used by the user equipment—a network selection procedure to find a higher priority mobile communication network is performed by the user equipment after a time interval has elapsed, wherein the user equipment comprises an entity realizing the functionality of a subscriber identity module, wherein the entity realizing the functionality of a subscriber identity module comprises a time interval related information such that the time interval, to be applied by the user equipment to perform the network selection procedure for a higher prioritized mobile communication network, depends on the time interval related information stored in the entity realizing the functionality of a subscriber identity module, wherein the information content of the time interval related information corresponds to a predetermined number of positive integer values, wherein the user equipment is configured such that the dependency of the time interval, to be applied by the user equipment, on the information content of the time interval related information corresponds to one out of the following alternatives:

according to a first alternative, the time interval corresponds to the information content of the time interval related information, multiplied by the product of a constant scaling value of 6 minutes and a time interval adaption factor, wherein the time interval adaption factor or the reciprocal of the time interval adaption factor corresponds to a value of 3 or larger than 3, especially a value of or in the vicinity of 5, or a value of or in the vicinity of 10, or a value of or in the vicinity of 20, or a value of or in the vicinity of 50, or a value of or in the vicinity of 100, or a value of or in the vicinity of 500, or a value of or in the vicinity of 1000, according to a second alternative, the time interval corresponds to the information content of the time interval related information, multiplied by a constant scaling value being different from 6 minutes, wherein the constant scaling value corresponds to at least 10 minutes, preferably at least 20 minutes, more preferably at least 30 minutes, still more preferably at least 60 minutes, still more preferably at least 100 minutes, still more preferably 120 minutes or at least 120 minutes, still more preferably at least 180 minutes, still more preferably at least 240 minutes, still more preferably at least 300 minutes, still more preferably at least 360 minutes, still more preferably at least 420 minutes, still more preferably at least 480 minutes, still more preferably at least 540 minutes, still more preferably at least 600 minutes, still more preferably at least 1000 minutes, according to a third alternative, the time interval corresponds to the information content of the time interval related information, multiplied by an increasing scaling value such that the increasing scaling value increases as a function of the information content of the time interval related information, according to a fourth alternative, the time interval corresponds to the result of a mapping of the information content of the time interval related information, wherein the mapping information defining the mapping is stored in a memory portion within the user equipment.

Thereby it is advantageously possible, that—also with respect to the system—it is possible that user equipment performs the network selection procedure less often and hence save electrical power in case that the mobile communication network and/or the radio access technology used by the user equipment corresponds to a mobile communication network or to a radio access technology or to a combination of mobile communication network and radio access technology having a sufficiently low priority.

Furthermore, the present invention relates to a program comprising a computer readable program code which, when executed on a computer or on a user equipment causes the computer or the user equipment to perform the inventive method.

The present invention also relates to a computer program product for an enhanced power consumption management of a user equipment using a mobile communication network and a radio access technology, the computer program product comprising a computer program stored on a storage medium, the computer program comprising program code which, when executed on a computer or on a user equipment causes the computer or the user equipment to perform the inventive method.

In FIG. 1, a mobile communication network 100 is schematically shown. In the example, the mobile communication network 100 comprises an access network 110 and a core network 120. The mobile communication network 100 is preferably a cellular telecommunications network comprising typically a plurality of network cells, wherein two radio cells of the mobile communication network 100 are represented in FIG. 1 by means of reference signs 11 and 12: a first radio cell 11, and a second radio cell 12. The access network 110 comprises at least a first base station entity 111 serving the first radio cell 11, and a second base station entity 112, serving the second radio cell 12. A plurality of user equipments 20, 20', 20" are schematically depicted in FIG. 1 as examples of user equipments in contact to the telecommunications network 100. The user equipments comprise a first user equipment 20, a second user equipment 20', and a third user equipment 20". The user equipments 20, 20', 20" are connected to at least one network node 121 of the core network of the mobile communication network 100.

According to embodiments of the present invention, a method, a user equipment 20 and a system for an enhanced power consumption management of a user equipment 20 using a mobile communication network 100 and a radio access technology are proposed.

According to embodiments of the invention, the user equipment 20 uses the mobile communication network 100 and a radio access technology to access the mobile communication network 100. Typically, each user equipment 20 is associated with a home mobile communication network, or home public land mobile network, HPLMN. Typically, user equipments are able to also connect to other mobile communication networks (than the home mobile communication network) that are called visited mobile communication network (or visited public land mobile networks, VPLMN). However, user equipments are typically incited not to use arbitrary mobile communication networks but to switch either to the home mobile communication network itself (if it is available or if this is possible) or at least to one or a plurality of preferred or prioritized mobile communication network(s). This is stipulated, e.g., in point 4.4.3.3 of 3GPP standardization document ETSI TS 123.122 V9.3.0 (2010_06). Hence, the user equipments (such as (the first) user equipment 20) are provided with a priority information regarding all or at least a plurality of mobile communication networks these user equipment are likely to use or to connect to. In case that the priority information related to the mobile communication network the user equipment 20 is camping on (or is using) is sufficiently low (i.e. typically if the condition is met that this priority information is lower than a predefined threshold value or priority threshold), the user equipment 20 is principally incited to perform a network selection procedure in order to search for other mobile communication networks having an increased value of the associated priority information. However, the network selection procedure is typically not performed anytime but as an additional condition that has to be met (in order to trigger a network selection procedure), a time interval has to have elapsed.

Hence, in the context of the present invention, this means that the user equipment 20 uses the mobile communication network 100, and the mobile communication network 100 does not correspond to the home mobile communication network of the user equipment 20, and the further assumption is that the priority information associated (within the user equipment 20) to the mobile communication network 100 (or regarding the mobile communication network 100) is sufficiently low as to trigger the network selection procedure, in order to find a higher priority mobile communication network, in case that the time interval has elapsed.

Figure 2:
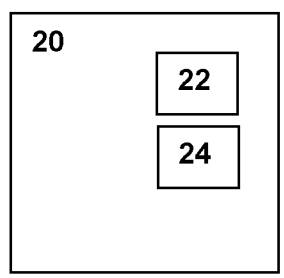
FIG. 2 schematically illustrates a user equipment according to the present invention.

In FIG. 2, a user equipment 20 according to the present invention is schematically shown. The user equipment 20 comprises an entity 22 realizing the functionality of a subscriber identity module, and a power source 24. In many cases the entity 22 realizing the functionality of a subscriber identity module might be a (removable and/or hardware) subscriber identity module (or a so-called subscriber identity module card, SIM card). However, the entity 22 realizing the functionality of a subscriber identity module could also be a non-removable module.

Figure 3:
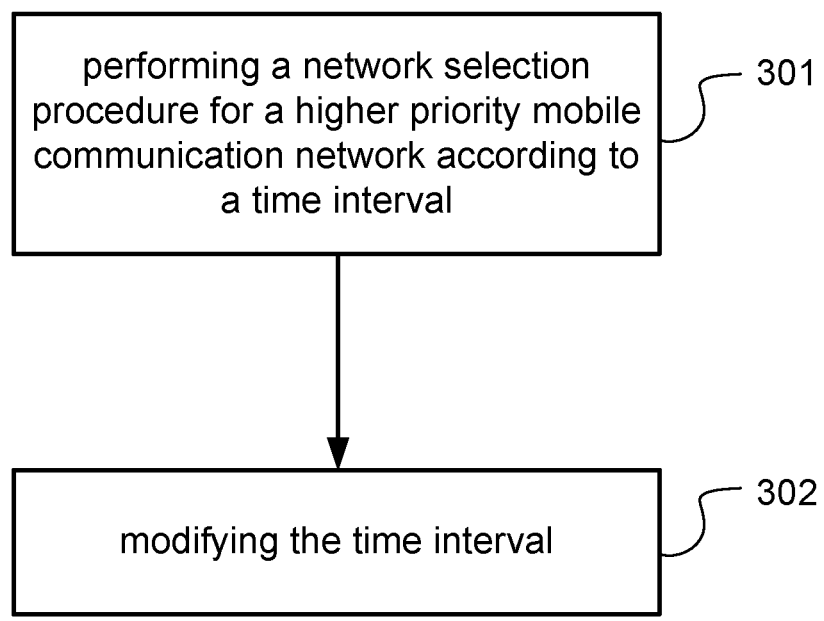
FIG. 3 is a flowchart illustrating an exemplary embodiment of the present invention.

The entity 22 realizing the functionality of a subscriber identity module comprises (e.g. in the Elementary Field of a SIM card) a time interval related information such that the time interval, to be applied by the user equipment 20 to perform the network selection procedure for a higher prioritized mobile communication network, depends on the time interval related information stored in the entity 22 realizing the functionality of a subscriber identity module. Stage 301 of FIG. 3 depicts performance of a network selection procedure for a higher priority mobile communication network according to a time interval. Typically, the information content of the time interval related information corresponds to a predetermined number of positive integer values (e.g. 80 integer values), wherein the dependency of the time interval, to be applied by the user equipment 20, on the information content of the time interval related information corresponds to one of the four following alternatives:

according to a first alternative, the time interval corresponds to the information content of the time interval related information, multiplied by the product of a constant scaling value of 6 minutes and a time interval adaption factor, wherein the time interval adaption factor or the reciprocal of the time interval adaption factor corresponds to a value of 3 or larger than 3, according to a second alternative, the time interval corresponds to the information content of the time interval related information, multiplied by a constant scaling value, wherein the constant scaling value corresponds to at least 10 minutes, according to a third alternative, the time interval corresponds to the information content of the time interval related information, multiplied by an increasing scaling value such that the increasing scaling value increases as a function of the information content of the time interval related information, according to a fourth alternative, the time interval corresponds to the result of a mapping of the information content of the time interval related information, wherein the mapping information defining the mapping is stored in a memory portion within the user equipment 20.

According to the present invention, it is preferred that, depending on the available residual power within the power source 24 of the user equipment 20, the time interval is modified, especially increased. Additionally or alternatively, it is preferred that, depending on the user equipment 20 being detected to be located at a special geographic area and/or depending on the user equipment 20 using a mobile communication network being part of a list of special mobile communication networks, the time interval is modified. Stage 302 of FIG. 3 depicts modification of the time interval.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for power consumption management of a user equipment using a mobile communication network and a radio access technology, the method comprising:
    performing, by the user equipment, based on priority information provided to the user equipment regarding at least one of the mobile communication network being used by the user equipment or the radio access technology being used by the user equipment, a network selection procedure to find a higher priority mobile communication network after a time interval has elapsed, wherein the time interval is based on time interval related information corresponding to a predetermined number of positive integer values, wherein:
        the time interval corresponds to the time interval related information multiplied by a product of a constant scaling value of 6 minutes and a time interval adaption factor, wherein the time interval adaption factor or the reciprocal of the time interval adaption factor is greater than or equal to 3;
        the time interval corresponds to the time interval related information multiplied by a constant scaling value of at least 10 minutes; or
        the time interval corresponds to the time interval related information multiplied by an increasing scaling value which increases as a function of the time interval related information;
    determining, by the user equipment, an amount of available residual power within a power source of the user equipment;
    in response to determining the amount of available residual power within the power source of the user equipment, modifying, by the user equipment, the time interval based on the amount of available residual power within the power source of the user equipment; and
    performing, by the user equipment, one or more further network selection procedures using the modified time interval.

2. The method according to claim 1, wherein at least one of the interval adaption factor, the constant scaling value, or the increasing scaling value is stored in a memory portion within the user equipment, wherein at least one of different interval adaption factors, different constant scaling values, or different increasing scaling values apply for different device categories of user equipments, wherein user equipments optimized for Machine-2-Machine communication or Internet-of-Things communication apply at least one of interval adaption factors, constant scaling values, or increasing scaling values such that a resulting time interval exceeds time intervals applied with other categories of user equipments.

3. The method according to claim 1, wherein the increasing scaling value increases exponentially.

4. The method according to claim 1, wherein power status information indicates different levels of power available to the user equipment;
    wherein the method further comprises: increasing, based on the power status information, the time interval by increasing one of the following: the time interval adaption factor, the time interval adaption factor and the constant scaling value, the constant scaling value, or the increasing scaling value.

5. The method according to claim 1, wherein the method further comprises:
    increasing, based on the user equipment being detected as being located at a special geographic area and/or based on the mobile communication network being used by the user equipment being part of a list of special mobile communication networks, the time interval by increasing one of the following: the time interval adaption factor, the time interval adaption factor and the constant scaling value, the constant scaling value, or the increasing scaling value.

6. The method according to claim 1, wherein at least one of the time interval adaption factor, the constant scaling value, or information defining the increasing scaling value is transmitted, using the mobile communication network, to the user equipment.

7. A system for power consumption management of a user equipment using a mobile communication network and a radio access technology, the system comprising:
    the mobile communication network; and
    the user equipment;

wherein the user equipment is configured, based on priority information provided to the user equipment regarding at least one of the mobile communication network being used by the user equipment or the radio access technology being used by the user equipment, to perform a network selection procedure to find a higher priority mobile communication network after a time interval has elapsed;

wherein the time interval is based on time interval related information corresponding to a predetermined number of positive integer values;

wherein:
- the time interval corresponds to the time interval related information multiplied by a product of a constant scaling value of 6 minutes and a time interval adaption factor, wherein the time interval adaption factor or the reciprocal of the time interval adaption factor is greater than or equal to 3;
- the time interval corresponds to the time interval related information multiplied by a constant scaling value of at least 10 minutes; or
- the time interval corresponds to the time interval related information multiplied by an increasing scaling value which increases as a function of the time interval related information;

wherein the user equipment is further configured to:
- determine an amount of available residual power within a power source of the user equipment; in response to determining the amount of available residual power within the power source of the user equipment, modify the time interval based on the amount of available residual power within the power source of the user equipment; and perform one or more further network selection procedures using the modified time interval;
- determine that the mobile communication network being used by the user equipment is part of a list of special mobile communication networks; in response to determining that the mobile communication network being used by the user equipment is part of the list of special mobile communication networks, increase the time interval by increasing one of the following: the time interval adaption factor, the time interval adaption factor and the constant scaling value, the constant scaling value, or the increasing scaling value; and perform one or more further network selection procedures using the increased time interval; and/or
- detect that the user equipment is located at a special geographic area; in response to detecting that the user equipment is located at the special geographic area, modify the time interval; and perform one or more further network selection procedures using the modified time interval.

8. The method according to claim 1, wherein the time interval adaption factor or the reciprocal of the time interval adaption factor corresponds to 5.

9. The method according to claim 1, wherein the time interval adaption factor or the reciprocal of the time interval adaption factor corresponds to 10.

10. The method according to claim 1, wherein the time interval adaption factor or the reciprocal of the time interval adaption factor corresponds to 20.

11. The method according to claim 1, wherein the time interval adaption factor or the reciprocal of the time interval adaption factor corresponds to 50.

12. The method according to claim 1, wherein the time interval adaption factor or the reciprocal of the time interval adaption factor corresponds to 100.

13. The method according to claim 1, wherein the constant scaling value corresponds to at least 20 minutes.

14. The method according to claim 1, wherein the constant scaling value corresponds to at least 30 minutes.

15. The method according to claim 1, wherein the constant scaling value corresponds to at least 60 minutes.

16. The method according to claim 1, wherein the constant scaling value corresponds to at least 100 minutes.

17. The method according to claim 1, wherein the constant scaling value corresponds to at least 180 minutes.

18. A user equipment comprising a processor and a non-transitory computer-readable medium having processor-executable instructions stored thereon for power consumption management of the user equipment, wherein the processor-executable instructions, when executed by the processor, facilitate:

performing, based on priority information provided to the user equipment regarding at least one of a mobile communication network being used by the user equipment or a radio access technology being used by the user equipment, a network selection procedure to find a higher priority mobile communication network after a time interval has elapsed, wherein the time interval is based on time interval related information corresponding to a predetermined number of positive integer values, wherein:
- the time interval corresponds to the time interval related information multiplied by a product of a constant scaling value of 6 minutes and a time interval adaption factor, wherein the time interval adaption factor or the reciprocal of the time interval adaption factor is greater than or equal to 3;
- the time interval corresponds to the time interval related information multiplied by a constant scaling value of at least 10 minutes; or
- the time interval corresponds to the time interval related information multiplied by an increasing scaling value which increases as a function of the time interval related information;

determining an amount of available residual power within a power source of the user equipment;

in response to determining the amount of available residual power within the power source of the user equipment, modifying the time interval based on the amount of available residual power within the power source of the user equipment; and performing one or more further network selection procedures using the modified time interval.

19. A method for power consumption management of a user equipment using a mobile communication network and a radio access technology, the method comprising:

performing, by the user equipment, based on priority information provided to the user equipment regarding at least one of the mobile communication network being used by the user equipment or the radio access technology being used by the user equipment, a network selection procedure to find a higher priority mobile communication network after a time interval has elapsed, wherein the time interval is based on time interval related information corresponding to a predetermined number of positive integer values, wherein:
the time interval corresponds to the time interval related information multiplied by a product of a constant scaling value of 6 minutes and a time interval adaption factor, wherein the time interval adaption factor or the reciprocal of the time interval adaption factor is greater than or equal to 3;

the time interval corresponds to the time interval related information multiplied by a constant scaling value of at least 10 minutes; or the time interval corresponds to the time interval related information multiplied by an increasing scaling value which increases as a function of the time interval related information;

determining, by the user equipment, that the mobile communication network being used by the user equipment is part of a list of special mobile communication networks;

in response to determining that the mobile communication network being used by the user equipment is part of the list of special mobile communication networks, increasing, by the user equipment, the time interval by increasing one of the following: the time interval adaption factor, the time interval adaption factor and the constant scaling value, the constant scaling value, or the increasing scaling value; and performing, by the user equipment, one or more further network selection procedures using the increased time interval.

20. A method for power consumption management of a user equipment using a mobile communication network and a radio access technology, the method comprising:

performing, by the user equipment, based on priority information provided to the user equipment regarding at least one of the mobile communication network being used by the user equipment or the radio access technology being used by the user equipment, a network selection procedure to find a higher priority mobile communication network after a time interval has elapsed, wherein the time interval is based on time interval related information corresponding to a predetermined number of positive integer values, wherein:

the time interval corresponds to the time interval related information multiplied by a product of a constant scaling value of 6 minutes and a time interval adaption factor, wherein the time interval adaption factor or the reciprocal of the time interval adaption factor is greater than or equal to 3;

the time interval corresponds to the time interval related information multiplied by a constant scaling value of at least 10 minutes; or the time interval corresponds to the time interval related information multiplied by an increasing scaling value which increases as a function of the time interval related information; and detecting, by the user equipment, that the user equipment is located at a special geographic area;

in response to detecting that the user equipment is located at the special geographic area, modifying, by the user equipment, the time interval; and performing, by the user equipment, one or more further network selection procedures using the modified time interval.

21. A user equipment comprising a processor and a non-transitory computer-readable medium having processor-executable instructions stored thereon for power consumption management of the user equipment, wherein the processor-executable instructions, when executed by the processor, facilitate:

performing, based on priority information provided to the user equipment regarding at least one of a mobile communication network being used by the user equipment or a radio access technology being used by the user equipment, a network selection procedure to find a higher priority mobile communication network after a time interval has elapsed, wherein the time interval is based on time interval related information corresponding to a predetermined number of positive integer values, wherein:

the time interval corresponds to the time interval related information multiplied by a product of a constant scaling value of 6 minutes and a time interval adaption factor, wherein the time interval adaption factor or the reciprocal of the time interval adaption factor is greater than or equal to 3;

the time interval corresponds to the time interval related information multiplied by a constant scaling value of at least 10 minutes; or the time interval corresponds to the time interval related information multiplied by an increasing scaling value which increases as a function of the time interval related information;

determining that the mobile communication network being used by the user equipment is part of a list of special mobile communication networks; and in response to determining that the mobile communication network being used by the user equipment is part of the list of special mobile communication networks, increasing the time interval by increasing one of the following: the time interval adaption factor, the time interval adaption factor and the constant scaling value, the constant scaling value, or the increasing scaling value; and performing one or more further network selection procedures using the increased time interval.

22. A user equipment comprising a processor and a non-transitory computer-readable medium having processor-executable instructions stored thereon for power consumption management of the user equipment, wherein the processor-executable instructions, when executed by the processor, facilitate:

performing, based on priority information provided to the user equipment regarding at least one of a mobile communication network being used by the user equipment or a radio access technology being used by the user equipment, a network selection procedure to find a higher priority mobile communication network after a time interval has elapsed, wherein the time interval is based on time interval related information corresponding to a predetermined number of positive integer values, wherein:

the time interval corresponds to the time interval related information multiplied by a product of a constant scaling value of 6 minutes and a time interval adaption factor, wherein the time interval adaption factor or the reciprocal of the time interval adaption factor is greater than or equal to 3;

the time interval corresponds to the time interval related information multiplied by a constant scaling value of at least 10 minutes; or the time interval corresponds to the time interval related information multiplied by an increasing scaling value which increases as a function of the time interval related information;

detecting, by the user equipment, that the user equipment is located at a special geographic area;

in response to detecting that the user equipment is located at the special geographic area, modifying the time interval; and performing one or more further network selection procedures using the modified time interval.

23. The method according to claim 1, wherein modifying the time interval based on the amount of available residual power further comprises:

comparing the amount of available residual power to a first threshold; and in response to the amount of available residual power being below the first threshold, increasing the time interval to a first modified time interval.

24. The method according to claim 23, wherein modifying the time interval based on the amount of available residual power further comprises:

comparing the amount of available residual power to a second threshold; and in response to the amount of available residual power being below the second threshold, further increasing the time interval to a second modified time interval, wherein the second modified time interval is larger than the first modified time interval.

25. The method according to claim 19, further comprising:

receiving, by the user equipment, the list of special mobile communication networks.

26. The method according to claim 20, further comprising:

receiving, by the user equipment, information indicating the special geographic area.

* * * * *